US011961380B2

United States Patent
(12) United States Patent
Walker et al.

(10) Patent No.: US 11,961,380 B2
(45) Date of Patent: Apr. 16, 2024

(54) SMOKE CHAMBER AS AUDIO CHAMBER IN AUDIBLE ALARM DEVICES

(71) Applicant: Electronic Modular Services Ltd., Herne Bay (GB)

(72) Inventors: Steven Walker, Herne Bay (GB); Doug Lawrence, Westgate-On-Sea (GB)

(73) Assignee: ELECTRONIC MODULAR SERVICES LTD., Herne Bay (GB)

( * ) Notice: Subject to any disclaimer, the term of this patent is extended or adjusted under 35 U.S.C. 154(b) by 698 days.

(21) Appl. No.: 15/734,852

(22) PCT Filed: Jun. 5, 2018

(86) PCT No.: PCT/GB2018/051531
§ 371 (c)(1),
(2) Date: Dec. 3, 2020

(87) PCT Pub. No.: WO2019/234376
PCT Pub. Date: Dec. 12, 2019

(65) Prior Publication Data
US 2021/0233374 A1 Jul. 29, 2021

(51) Int. Cl.
*G08B 17/113* (2006.01)
*G08B 3/10* (2006.01)
(Continued)

(52) U.S. Cl.
CPC .............. *G08B 17/113* (2013.01); *G08B 3/10* (2013.01); *H04R 1/025* (2013.01); *H04R 1/2811* (2013.01); *H04R 1/345* (2013.01); *H04R 17/00* (2013.01)

(58) Field of Classification Search
CPC ........ G08B 17/113; G08B 3/10; H04R 1/025; H04R 1/2811; H04R 1/345; H04R 17/00
See application file for complete search history.

(56) References Cited

U.S. PATENT DOCUMENTS 4,388,617 A 6/1983 Nakanishi et al.
6,512,450 B1 1/2003 Burnett et al.
(Continued)

FOREIGN PATENT DOCUMENTS

CN 203606921 U 5/2014
CN 205211407 U 5/2016
(Continued)

OTHER PUBLICATIONS

ISR/WO; Application No. PCT/GB2018/051531; mailed Feb. 25, 2019; 18 pages.

*Primary Examiner* — Curtis B Odom
(74) *Attorney, Agent, or Firm* — CANTOR COLBURN LLP

(57) ABSTRACT

A audible alarm device (AAD) having: a housing extending axially upwardly and radially outwardly, and having an axial bottom portion and an axial top portion, the top portion having a smoke chamber defined by: a top surface that is planar and having a first diameter, a bottom surface separating the top portion from the bottom portion, the bottom surface being planar and having a second diameter that is larger than the first diameter, a side surface connecting the top and bottom surfaces, and a circumferential opening in the side surface providing fluid egress to the smoke chamber, a piezo sounder disposed in the smoke chamber, radially centered within the top portion and axially proximate the top surface of the top portion, the piezo sounder configured to direct sound to the bottom surface.

18 Claims, 2 Drawing Sheets

(51) Int. Cl.

| | |
|---|---|
| ***H04R 1/02*** | (2006.01) |
| ***H04R 1/28*** | (2006.01) |
| ***H04R 1/34*** | (2006.01) |
| ***H04R 17/00*** | (2006.01) |

(56) References Cited

U.S. PATENT DOCUMENTS

| | | | | |
|---|---|---|---|---|
| 8,757,318 | B2 | 6/2014 | Runciman et al. | |
| 9,384,638 | B2 | 7/2016 | Yamano | |
| 9,552,705 | B2 | 1/2017 | Morris | |
| 9,589,429 | B2 | 3/2017 | Sun | |
| 2007/0035406 | A1 | 2/2007 | Cook et al. | |
| 2013/0076511 | A1 | 3/2013 | Blanc et al. | |
| 2016/0335868 | A1* | 11/2016 | Schmidt | G08B 17/107 |
| 2016/0335869 | A1* | 11/2016 | Mittleman | G08B 17/107 |

FOREIGN PATENT DOCUMENTS

| | | | | |
|---|---|---|---|---|
| CN | 106875597 | A | 6/2017 | |
| EP | 1258848 | A2 | 11/2002 | |
| EP | 2093730 | A1 | 8/2009 | |
| EP | 2104079 | A1 | 9/2009 | |
| EP | 2804159 | A1 | 11/2014 | |
| GB | 2306218 | A | 4/1997 | |
| GB | 2393846 | A | 4/2004 | |
| GB | 2421620 | A | 6/2006 | |
| GB | 2449257 | A | 11/2008 | |
| GB | 2449257 | A * | 11/2008 | G08B 17/103 |
| JP | 4725556 | B2 | 7/2011 | |
| JP | 5793686 | B2 | 10/2015 | |
| WO | 2005020174 | A1 | 3/2005 | |
| WO | 2008011413 | A2 | 1/2008 | |
| WO | 2008139183 | A1 | 11/2008 | |
| WO | 2011042020 | A1 | 4/2011 | |

* cited by examiner

SMOKE CHAMBER AS AUDIO CHAMBER IN AUDIBLE ALARM DEVICES

CROSS REFERENCE TO RELATED APPLICATIONS

This is a US National Stage of Application No. PCT/GB2018/051531, filed on Jun. 5, 2018. the disclosure of which is incorporated herein by reference.

BACKGROUND

Exemplary embodiments pertain to the art of hazard detectors and more specifically to the configuration of a smoke chamber of an audible alarm devices (AAD) as an audio chamber.

Audible alarm devices (AAD), such as smoke detectors, should be designed to properly distribute an auditory alarm while utilizing a small volume of room space. AAD designs, however, may tend to be large to obtain a large sound projection. For example, AAD design the audio element may be placed in the base of the AAD, which would increase an overall height profile of the AAD.

BRIEF DESCRIPTION

Disclosed is an audible alarm device (AAD) comprising: a housing extending upwardly in an axial direction A and outwardly in a radial direction R, the housing including a bottom portion that is an axial bottom portion and a top portion that is an axial top portion, the top portion including a smoke chamber defined by: a top surface that is substantially planar and having a first diameter, a bottom surface separating the top portion from the bottom portion, the bottom surface being substantially planar and having a second diameter that is larger than the first diameter, a side surface that connects the top surface with the bottom surface, and a circumferential opening in the side surface providing fluid egress to the smoke chamber, a piezo sounder being disposed in the smoke chamber, radially centered within the top portion and axially proximate the top surface of the top portion, the piezo sounder being configured to direct sound to the bottom surface, whereby the sound resonates in the smoke chamber and spreads while propagating out of the smoke chamber through the circumferential opening.

In addition to one or more of the above features or as an alternative, the smoke chamber includes a deflector ring connected within the top portion, the deflector ring being axially proximate and radially outside the piezo sounder, wherein the deflector ring has an arcuate cross section that opens in an axially downward direction to redirect sound that is resonating off the bottom surface, whereby the sound propagates toward the circumferential opening.

In addition to one or more of the above features or as an alternative, the bottom portion of the housing is cylindrical, the top portion of the housing is frustoconical, and the circumferential opening has an axial span that is greater than fifty percent (50%) of an axial span of the side surface.

In addition to one or more of the above features or as an alternative, the circumferential opening is a first circumferential opening of a plurality of circumferential openings, the plurality of circumferential openings including a second circumferential opening and the side surface forms a support rib between the first circumferential opening and the second circumferential opening.

In addition to one or more of the above features or as an alternative, the circumferential opening includes a plurality of louvers including a first louver and a second louver that extend radially outwardly.

In addition to one or more of the above features or as an alternative, the plurality of louvers are axially spaced to divide the axial span of the circumferential opening into a plurality of louvered sections, including a first louvered section and a second louvered section, wherein the plurality of louvered sections have a same axial span.

In addition to one or more of the above features or as an alternative, an axial span of the top portion and an axial span of the bottom portion are the same.

In addition to one or more of the above features or as an alternative, the AAD includes one or more of: a light source extending outwardly from a radial center of the top surface; and one or more sensors, the one or more sensors including one or more of heat sensing elements and gas sensing elements.

In addition to one or more of the above features or as an alternative, the light source consists of a light emitting diode (LED) or a plurality of light emitting diodes on a printed circuit board PCB wherein the PCB is axially fixed to the top surface of the top portion.

In addition to one or more of the above features or as an alternative, the AAD includes a filter disposed within the smoke chamber, the filter being disk shaped, radially centered within top portion and being axially aligned with circumferential opening.

In addition, a method is disclosed of propagating sound from an AAD, wherein the AAD includes one or more of the above features.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
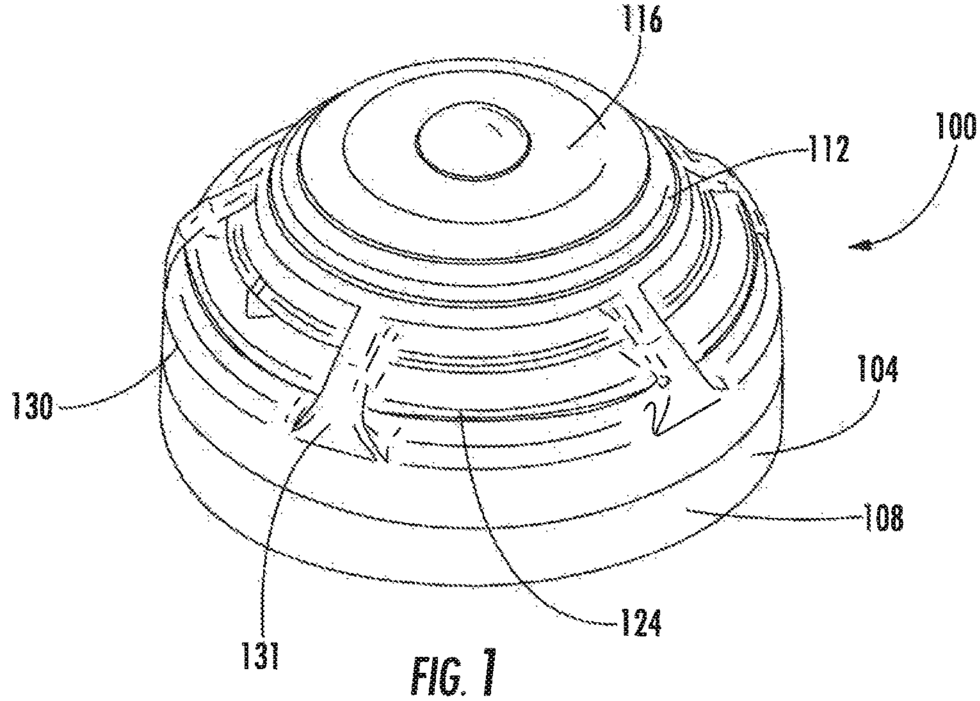
FIG. 1 is a perspective view of an audible alarm device (AAD) according to an embodiment.

A detailed description of one or more embodiments of the disclosed apparatus and method are presented herein by way of exemplification and not limitation with reference to the Figures.

With reference to the figures, an audible alarm device (AAD) 100 is disclosed, The AAD 100 may include a housing 104 extending upwardly in an axial direction A and outwardly in a radial direction R. The housing 104 may include a bottom portion 108 that is an axial bottom portion and a top portion 112 that is an axial top portion. The bottom portion 108 being configured to mount to a ceiling or socket. The bottom portion 108 may be cylindrical and the top portion 112 may by frustoconical.

The top portion 112 may include a smoke chamber 114. The smoke chamber 114 may be defined in part by a top surface 116 that may be substantially planar and may have a first diameter. The smoker chamber 114 may be additionally defined in part by a bottom surface 118 which may separate the top portion 104 from the bottom portion 108. The bottom surface 118 may be substantially planar and may have a second diameter that is larger than the first diameter. The smoke chamber 114 may be further defined in part by a side surface 120 that is frustoconical and may connect the top surface 116 with the bottom surface 118. A circumferential opening 124 may be provided in the side surface 120, and which may provide fluid egress to the smoke chamber 114, that is, for smoke and air.

A piezo sounder 128 may be disposed in the smoke chamber 114. The piezo sounder 128 may be radially centered within the top portion 112 and axially proximate the top surface 116 of the top portion 112. The piezo sounder 128 may be configured to direct sound 129 to the bottom surface 118. From this configuration, the sound 129 may resonate in the smoke chamber 114 and spreads while propagating out of the smoke chamber 114 through the circumferential opening 124.

The smoke chamber 114 may include a deflector ring 132 connected within the top portion 112. The deflector ring 132 may be axially proximate and radially outside the piezo sounder 128. The deflector ring 132 may have an arcuate cross section that opens in an axially downward direction. From this configuration the deflector ring 132 may direct sound 129 that resonating off the bottom surface 118 so that the sound 129 may propagate toward the circumferential opening 124.

Figure 2:
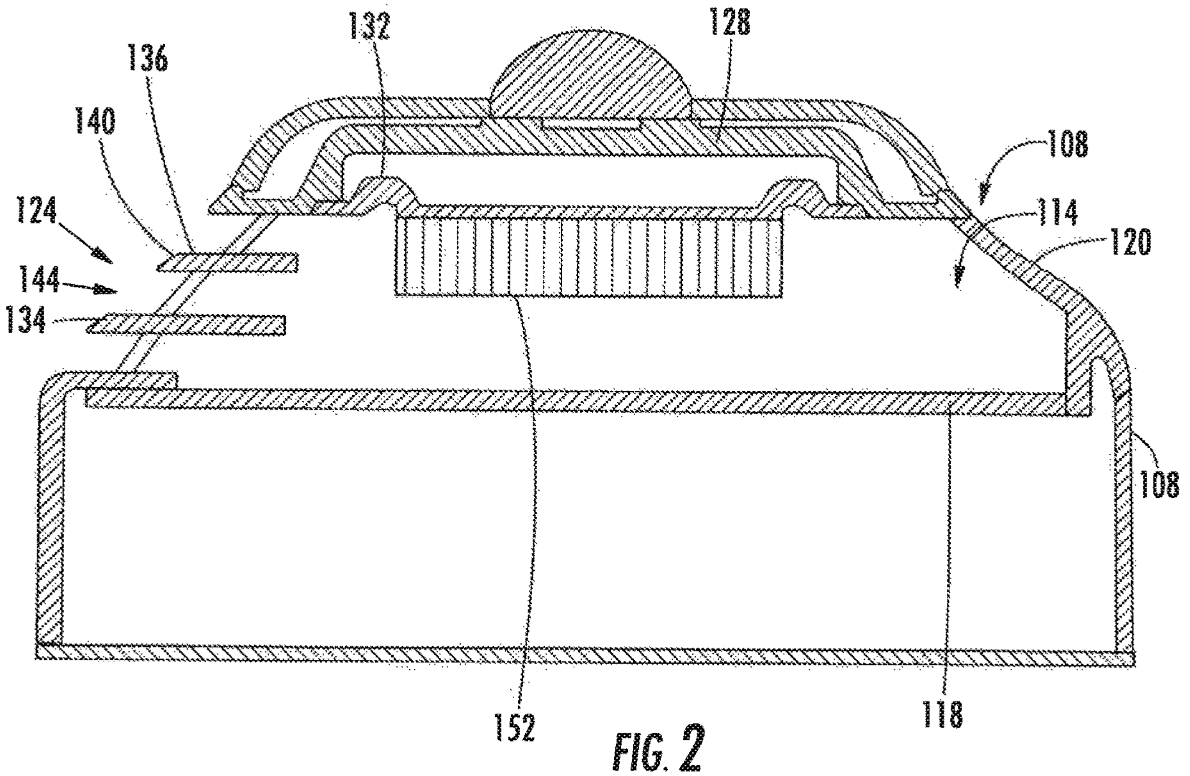
FIG. 2 is a cross section view of an AAD according to an embodiment.

With further reference to FIGS. 1 and 2, the circumferential opening 124 may have an axial span that is greater than fifty percent (50%) of an axial span of the side surface 120. In addition, the circumferential opening 124 may be a first circumferential opening of a plurality of circumferential openings, where the plurality of circumferential openings may include at least a second circumferential opening 130. The side surface 120 may form a support rib 131 between the first circumferential opening 124 and the second circumferential opening 130.

The circumferential opening 124 may include a plurality of louvers including a first louver 134 and a second louver 136. The plurality of louvers may extend radially outwardly. In addition, the plurality of louvers may be axially spaced to divide the axial span of the circumferential opening 124 into a plurality of louvered sections. The plurality of louvered sections may include a first louvered section 140 and a second louvered section 144. The plurality of louvered sections may have a same axial span.

With reference to FIG. 2, an axial span of the top portion 2 and an axial span of the bottom portion 108 may be the same. Though other axial span configurations are within the scope of the disclosure.

Figure 3:
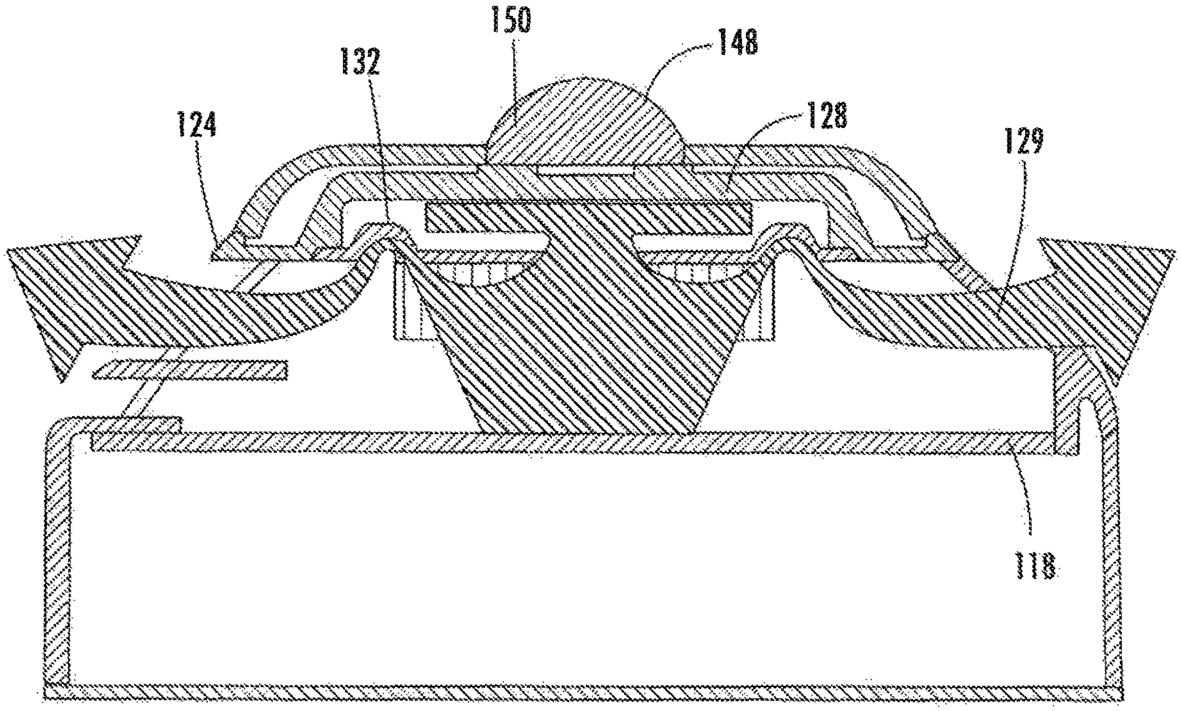
FIG. 3 is a cross section view of an AAD according to an embodiment.

Turning to FIG. 3, the AAD 100 may include a light source 148 extending outwardly from a radial center of the top surface 116. The light source 148 may consist of a light emitting diode (LED) or a plurality of light emitting diodes on a printed circuit board PCB 150. The PCB 150 may be axially fixed to the top surface 116 of the top portion 112.

With continued reference to FIG. 2, the AAD 100 may include a filter 152 disposed within the smoke chamber 114. The filter 152 may be disk shaped and may be radially centered within the top portion 112. In addition, the filter 152 may be axially aligned with circumferential opening 124.

In one or more embodiments the AAD 100 may include one or more sensors. The one or more sensors may include heat sensing elements and/or gas sensing element. In addition, the gas sensing elements may detect carbon monoxide (CO).

The above disclosed embodiments use the smoke chamber as an audio chamber for spreading sound. By centrally mounting the piezo sound above the smoke chamber the piezo may not impede movement of smoke. The above disclosed configuration may allow for lower profile AAD.

The term "about" is intended to include the degree of error associated with measurement of the particular quantity based upon the equipment available at the of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A audible alarm device (AAD) comprising:

a housing extending upwardly in an axial direction and outwardly in a radial direction, the housing including a bottom portion that is an axial bottom portion that is cylindrical and a top portion that is an axial top portion that is frustoconical, the top portion including a smoke chamber defined by:

a top surface that is substantially planar and having a first diameter, a bottom surface separating the top portion from the bottom portion, the bottom surface being substantially planar and having a second diameter that is larger than the first diameter, a side surface that connects the top surface with the bottom surface, and a circumferential opening in the side surface providing fluid egress to the smoke chamber, a piezo sounder being disposed in the smoke chamber, radially centered within the top portion and axially proximate the top surface of the top portion, the piezo sounder being configured to direct sound to the bottom surface, whereby the sound resonates in the smoke chamber and spreads while propagating out of the smoke chamber through the circumferential opening, wherein the smoke chamber includes a deflector ring connected within the top portion, the deflector ring being axially proximate and radially outside the piezo sounder, wherein the deflector ring has an arcuate cross section that opens in an axially downward direction to redirect sound that is resonating off the bottom surface, whereby the sound propagates toward the circumferential opening.

2. The AAD of claim 1, wherein the circumferential opening has an axial span that is greater than fifty percent (50%) of an axial span of the side surface.

3. The AAD of claim 2 wherein the circumferential opening is a first circumferential opening of a plurality of circumferential openings, the plurality of circumferential openings including a second circumferential opening and the side surface forms a support rib between the first circumferential opening and the second circumferential opening.

4. The AAD of claim 2 wherein the circumferential opening includes a plurality of louvers including a first louver and a second louver that extend radially outwardly.

5. The AAD of claim 4 wherein the plurality of louvers are axially spaced to divide the axial span of the circumferential opening into a plurality of louvered sections, including a first louvered section and a second louvered section, wherein the plurality of louvered sections have a same axial span.

6. The AAD of claim 1 wherein an axial span of the top portion and an axial span of the bottom portion are the same.

7. The AAD of claim 4 including a one or more of:

a light source extending outwardly from a radial center of the top surface; and one or more sensors, the one or more sensors including one or more of heat sensing elements and gas sensing elements.

8. The AAD of claim 7 wherein the light source is an array of light emitting diodes (LED) on a printed circuit board (PCB) wherein the PCB is axially fixed to the top surface of the top portion.

9. The AAD of claim 1 including a filter disposed within the smoke chamber, the filter being disk shaped, radially centered within the top portion and being axially aligned with circumferential opening.

10. A method of propagating sound from a audible alarm device (AAD), wherein the AAD includes:

a housing extending upwardly in an axial direction and outwardly in a radial direction, the housing including a bottom portion that is an axial bottom portion that is cylindrical and a top portion that is an axial top portion that is frustoconical, the top portion including a smoke chamber defined by:

a top surface that is substantially planar and having a first diameter, a bottom surface separating the top portion from the bottom portion, the bottom surface being substantially planar and having a second diameter that larger than the first diameter, a side surface that connects the top surface with the bottom surface, and a circumferential opening in the side surface providing fluid egress to the smoke chamber, a piezo sounder being disposed in the smoke chamber, radially centered within the top portion and axially proximate the top surface of the top portion, the method comprising directing sound from the piezo sounder to the bottom surface, whereby the sound resonates in the smoke chamber and spreads while propagating out of the smoke chamber through the circumferential opening, wherein the smoke chamber includes a deflector ring connected within the top portion, the deflector ring being axially proximate and radially outside the piezo sounder, wherein the deflector ring has an arcuate cross section that opens in an axially downward direction to redirect sound that is resonating off the bottom surface, whereby the sound propagates out toward the circumferential opening.

11. The method of claim 10, wherein the circumferential opening has an axial span that is greater than fifty percent (50%) of an axial span of the side surface.

12. The method of claim 11 wherein the circumferential opening is a first circumferential opening of a plurality of circumferential openings, the plurality of circumferential openings including a second circumferential opening and the side surface forms a support rib between the first circumferential opening and the second circumferential opening.

13. The method of claim 11 wherein circumferential opening includes a plurality of louvers including a first louver and a second louver that extend radially outwardly.

14. The method of claim 13 wherein the plurality of louvers are axially spaced to divide the axial span of the circumferential opening into a plurality of louvered sections, including a first louvered section and a second louvered section, wherein the plurality of louvered sections have a same axial span.

15. The method of claim 10 wherein an axial span of the top portion and an axial span of the bottom portion are the same.

16. The method of claim 13 including one or more of:

a light source extending outwardly from a radial center of the top surface; and one or more sensors, the one or more sensors including one or more of heat sensing elements and gas sensing elements.

17. The method of claim 16 wherein the light source is an array of light emitting diodes (LED) on a printed circuit board (PCB) wherein the PCB is axially fixed to the top surface (116) of the top portion (112).

18. The method of claim 10 including a filter disposed within the smoke chamber, the filter being disk shaped, radially centered within the top portion and being axially aligned with circumferential opening.

* * * * *